Dec. 15, 1925. 1,565,823
D. STALEY
OPTICAL INSTRUMENT
Filed Dec. 18, 1924 2 Sheets-Sheet 2
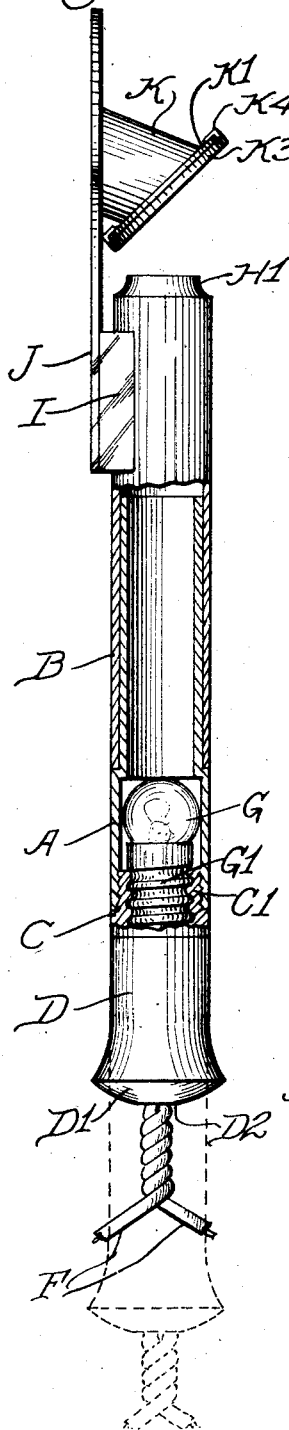
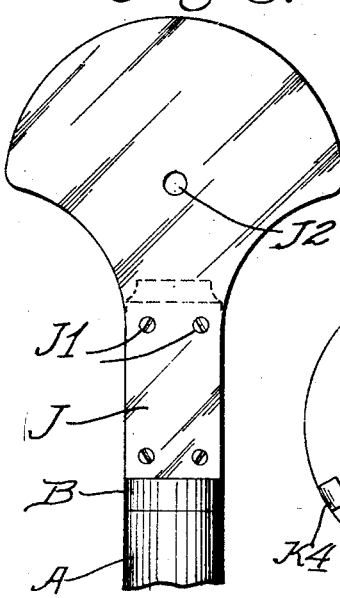
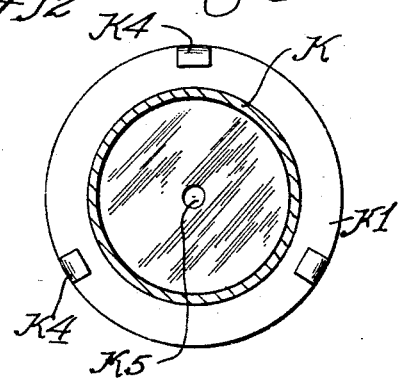
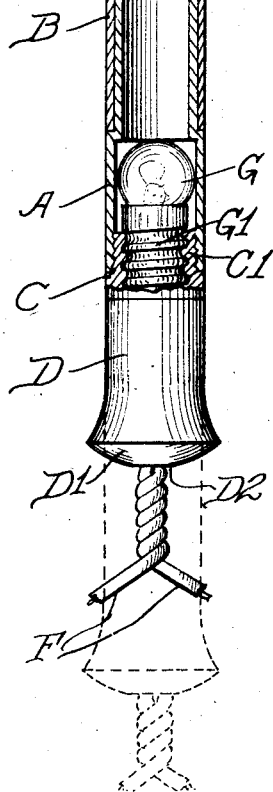
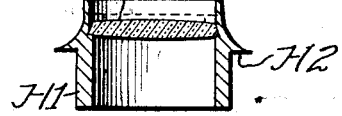
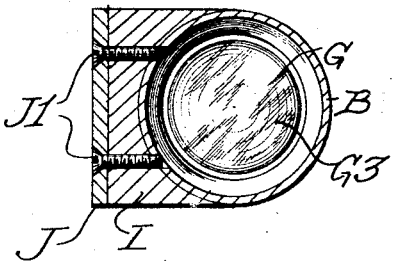
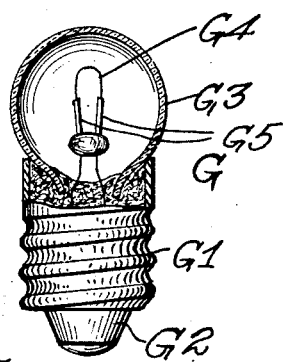
Inventor
Darwin Staley
By Cyrus Kehr
Attorney Patented Dec. 15, 1925.

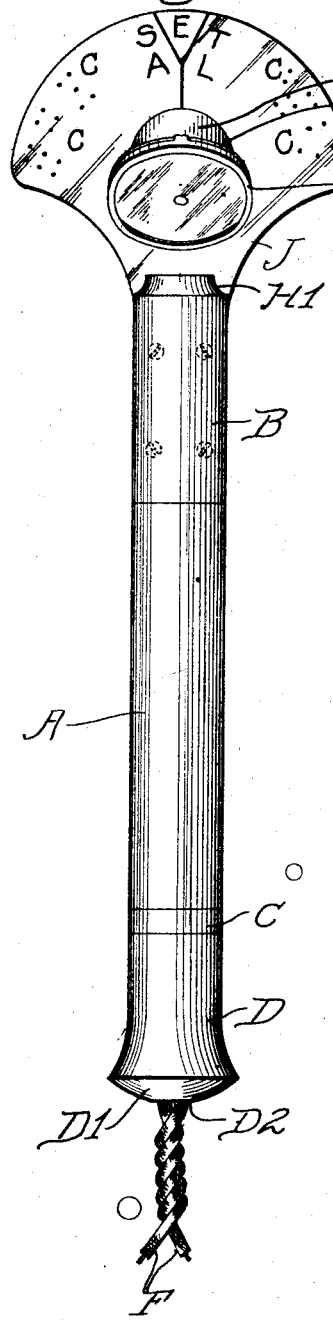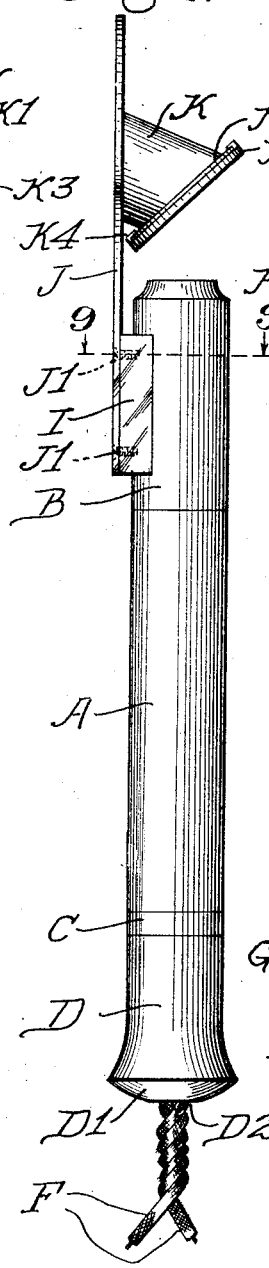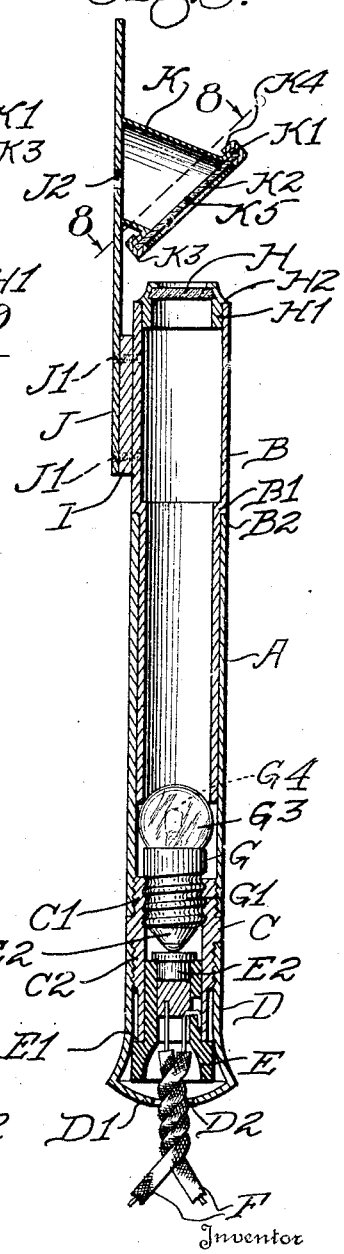

1,565,823

UNITED STATES PATENT OFFICE.

DARWIN STALEY, OF MEMPHIS, TENNESSEE.

OPTICAL INSTRUMENT.

Application filed December 18, 1924. Serial No. 756,824.

*To all whom it may concern:*

Be it known that I, DARWIN STALEY, a citizen of the United States, residing at Memphis, in the county of Shelby and State of Tennessee, have invented a new and useful Improvement in Optical Instruments, of which the following is a specification, reference being had to the accompanying drawing.

My invention relates particularly to optical instruments which are used for examining eyes, such instruments being designated by the names, retinoscope, ophthalmoscope, skiascope, etc.

Similar instruments heretofore in use have had a hollow body, a lamp in the body, an oblique mirror for changing the course of the light rays coming from the lamp and directing them to the eye, and a lens between the mirror and the lamp, the function of the lens being to reduce the divergence of the light rays coming from the lamp. The light produced by such an instrument is similar to the spot light used in theaters.

The object of this invention is to provide an instrument which will produce a light field or illuminated area on which the illumination is substantially uniform and of intensity sufficient for inspection of the eye but not so intense as to cause abnormal physical effort by the patient whereby a false condition of the eye is presented. The major consideration is to produce an even distribution of illumination over the light field or illuminated area, in order that inspection of the eye by the operator will not indicate conditions in the eye which do not exist.

Other similar instruments produce light fields which are so unevenly illuminated as to indicate eye defects or conditions which do not exist.

In the accompanying drawings,

Fig. 1 is an elevation of an instrument embodying my improvement, the view being toward the face which is directed toward the patient during use of the instrument. For convenience, that face will be called the front of the instrument;

Fig. 2 is an elevation of the same instrument looking toward the right, as shown in Fig. 1;

Fig. 3 is a longitudinal central section of the instrument shown in Fig. 1;

Fig. 4 shows the instrument in another form;

Fig. 5 is a rear view of the upper part of the instrument, shown by Fig. 1;

Fig. 6 is a longitudinal section through the lens and the lens ring;

Fig. 7 is a sectional detail of the lamp;

Fig. 8 is a section on the line, 8—8, of Fig. 3, looking in the direction of the arrows;

Fig. 9 is a transverse section on the line, 9—9, of Fig. 2, looking downward.

Referring first to all of the drawings excepting Fig. 4, A is the first section of the body of the instrument; B is the second section of said body; C is the third section of said body, and D is the fourth section of said body. The section, B, telescopes into the section, A, and is contracted at $B^1$, to form an annular shoulder, $B^2$, adapted to bear against the upper end of the section, A, to limit the downward movement of the section, B. The external diameter of the part of the section, B, above the shoulder, $B^2$, is the same as the external diameter of the section, A. The upper part of the section, C, is contracted to form a neck, $C^1$, which is exteriorly screw-threaded to engage corresponding threading on the interior of the section, A. The lower part of the section, C, is reduced to form a neck, $C^2$, the upper part of which is exteriorly screw-threaded to engage corresponding interior threading on the upper part of the inner face of the section, D. The lower end of the section, D, has a cross wall, $D^1$, in which is a central aperture, $D^2$.

A contact plug, E, rests in the lower part of the section, D, and has near its lower end a shoulder $E^1$, which bears against the lower end of the section, C, and serves to limit the upward movement of said plug when the latter is inserted. Electric current wires, F, extend through the aperture, $D^2$, and are connected to the plug, E, in the usual manner. This plug is of well-known construction. In its upper end is a central electrode, $E^2$.

The lamp, G, (Figs. 3 and 7) has a screw-threaded body, $G^1$, adapted to be threaded into the interior threading in the upper end of the section, C. At the lower end of said body is the electrode, $G^2$, which is adapted to bear against the electrode, $E^2$, when the lamp is in its working position. On the body, $G^1$, is seated the glass bulb, $G^3$. Within said bulb is the filament, $G^4$, supported on standards, $G^5$. These standards are placed near each other, in order that the horizontal measurement of the filament in the plane of the standards, $G^5$, may be small, whereby the ratio between that measurement and the transverse measurement of the filament will be made as small as feasible.

The lens, H, is seated in the lens ring, $H^1$. The lower part of said ring is cylindrical and of a diameter to fit snugly into the upper end of the body section, B. At the upper end of said part, the ring has an annular shoulder, $H^2$, normally resting against the upper end of the section, B. Above the lens, the ring is beaded inward or otherwise formed to engage the edge of the lens.

The distance between the lens, H, and the filament, $G^4$, is so long as to permit the use of a lens of low power. In an instrument which I have for some time had in regular use, this lens is a five dioptre lens and said distance is seventy-five millimeters when the section, B, is at its lower limit on the section, A. This distance between the lens and the filament may be increased by raising the section, B, on the section, A.

The interior surfaces of the body section, B, is made black for the absorption of light rays striking those surfaces.

On the rear face of the upper part of the section, B, is a block, I. The face of said block which bears against the section, B, is concaved to fit the exterior of the section, B. The rear face of the block, I, is flat. A flat plate, J, extends across the rear face of said block. Screws, $J^1$, extend through said plate and the block, I, into the adjacent wall of the section, B, whereby said block and said plate are immovably secured to said section. The plate, J, extends upward higher than the lens, H, and is fan shape. On the front face of the plate, J, is secured a short tube, K, which inclines downward and which has its front end formed slanting so as to meet a plane which is at approximately forty-five degrees to the axis of the sections, A, B and C. The outer end of the tube, K, has an outward directed marginal flange, $K^1$. A circular mirror, $K^2$, extends across said end and rests against said flange. A ring, $K^3$, embraces the edge of the mirror and the flange, $K^1$, and has tongues, $K^4$, bent over the rear of the flange, K, whereby the mirror is secured to said flange. The reflecting coating of the mirror is on the inner face of the mirror. At about the center of the mirror is an aperture or sight hole, $K^5$. At approximately the axial line of the tube, K, the plate, J, has an aperture or sight hole, $J^2$. This aperture is preferably lower than said axial line, in order that the operator may hold the instrument approximately in the upright position while observing an eye. While using the instrument, the operator directs the front of the instrument toward the patient and looks through the sight apertures, $J^2$ and $K^4$, to the eye of the patient, the eye being illuminated by the light which passes upward from the filament, $G^4$, through the lens, H, and against the mirror, $K^2$, and thence at an angle of approximately forty-five degrees to the eye of the patient. The cross sectional area of the beam or trunk of light at the eye is preferably only large enough to form a field or "spot" which will well cover the eye, in order that the least light may be wasted by applying it outside of the area which is to be inspected. Usually in practice, the instrument is held at a distance of about twenty-eight inches from the eye of the patient. For that distance, the light field or "spot" is of suitable diameter when the body section, B, is at its lower limit in the body section, A, whereby the distance between the lens and the filament is brought to the minimum. For some conditions in the eye, it is desirable to make the observation at a longer distance from the eye. In such case, the body section, B, is appropriately raised to increase the distance between the lens and the filament, in order that the light rays leaving the mirror may converge so as to bring the light beam or trunk to the desired diameter at the eye.

This instrument produces at the operating distance a substantially circular illuminated area throughout which area the illumination is approximately even, whereby the production of false refractive errors is avoided and whereby the creating of a false condition in the eye is avoided.

In Fig. 4, the structure is the same as in Figs. 1, 2 and 3, excepting that the upper part of the body section, A, is reduced in diameter and extends into the body section, B. This form also permits moving the section, B, upward for increasing the distance between the filament and the lens As above indicated, my improved instrument embodies two important features: (1) the relatively long distance between the lens and the lamp filament, and (2) the narrow form of the filament body. Placing the filament within the tube at a relatively long distance from the lens, causes the arrival of light rays from the filament to the lens in nearly parallel form. This permits or requires the use of a low power lens for making the limited reduction of light divergence needed to bring the cross section of the light trunk or body to the desired diameter at the distance from the lens at which the eye is to be observed by the operator. By thus delivering the light, interference is reduced to the minimum. This relatively large distance between the lens and the filament also reduces the effect of the difference between the two transverse dimensions of the filament—the cross sectional thickness of the filament and the distance between the upright parts of the filament which constitutes the measure of the linear upward exposure of the filament. Reducing this ratio reduces the tendency to form an oval light field having more intense illumination along the plane of the filament than along a plane perpendicular to the last-mentioned plane and cutting the axis of the lamp. The above-mentioned ratio is further reduced by reducing the distance between the upright parts of the filament, whereby the linear upward exposure of the filament is reduced.

In Fig. 1, on the front face of the plate, J, are shown symbols which are to be used for making dynamic tests of the eye. Above the tube, K, is the Y-form symbol, L, the stem of which is in the plane which is perpendicular to said plate and cuts the axis of the instrument, whereby said symbol is balanced on said plane. The letters and dots are examples of symbols which are to be arranged concentric to the center of the mirror or the line of sight.

In practice, I have found that the voltage of the current used for the lamp may range from 4 down to ½ or less, until the light is quite weak, and yet through all that range the distribution of the light on the light field is substantially uniform and without material halo or other objectionable feature. Perhaps it may be said that there is a faint halo, but that it is so weak that it may be considered absent.

I claim as my invention,

1. In an instrument of the kind described, the combination of a tubular body, an oblique mirror supported above the upper end of said body and provided with a sight aperture, a low power lens in the upper end of said body, and an electric lamp in said body spaced from the lens a distance which is long relative to the distance between the lamp and the lens usually found in this art, substantially as described.

2. In an instrument of the kind described, the combination of an extensible tubular body, an oblique mirror supported above the upper end of said body and provided with a sight aperture, a low power lens in the upper end of said body, and an electric lamp in said body spaced from the lens a distance which is long relative to the distance between the lamp and the lens usually found in this art, substantially as described.

3. In an instrument of the kind described, the combination of a tubular body, an oblique mirror supported above the upper end of said body and provided with a sight aperture, a low power lens in the upper end of said body. and an electric lamp in said body spaced from the lens a distance which is long relative to the distance between the lamp and the lens usually found in this art and having a filament presenting limited linear upward exposure, substantially as described.

4. In an instrument of the kind described, the combination of an extensible tubular body, an oblique mirror supported above the upper end of said body and provided with a sight aperture, a low power lens in the upper end of said body, and an electric lamp in said body spaced from the lens a distance which is long relative to the distance between the lamp and the lens usually found in this art and having a filament presenting limited l'near upward exposure, substantially as described 5. In an instrument of the kind described, an elongated tubular body, a plate in a plane approximately parallel to the length of said body and supported by and rising above the body and being wider than the body and having a sight aperture, an oblique mirror supported on said plate and being centrally apertured, and the front face of said plate being provided with symbols distributed approximately concentric to the mirror, a lens in the upper part of said body, and an electric lamp in said body spaced from the lens a distance which is long relative to the distance between the lamp and the lens usually found in this art, substantially as described.

In testimony whereof I have signed my name, this 12th day of December, in the year one thousand nine hundred and twenty-four.

DARWIN STALEY.